United States Patent [19]
Harris et al.

[11] 4,127,420
[45] Nov. 28, 1978

[54] COMMINUTION PROCESS AND PIGMENT

[75] Inventors: Dominic R. Harris, Mount Waverley; Lance E. Rowley, St. Kilda, both of Australia

[73] Assignee: Pigment Manufacturers of Australia Limited, Melbourne, Australia

[21] Appl. No.: 727,383

[22] Filed: Sep. 27, 1976

[30] Foreign Application Priority Data

Oct. 13, 1975 [AU] Australia ............................. 3560/75

[51] Int. Cl.² ............................................. C09B 67/00
[52] U.S. Cl. ................................. 106/288 Q; 106/309
[58] Field of Search ............................ 106/309, 288 Q

[56] References Cited

U.S. PATENT DOCUMENTS

| 2,816,115 | 12/1957 | Howell | 106/309 |
| 3,758,321 | 9/1973 | Santimauro et al. | 106/309 |
| 4,013,481 | 3/1977 | Molls et al. | 106/288 Q |

*Primary Examiner*—James Poer
*Attorney, Agent, or Firm*—Cushman, Darby & Cushman

[57] ABSTRACT

A process of comminution comprising firstly grinding a mixture of a crude pigment and a fugitive auxiliary and secondly deactivating the fugitive auxiliary.

21 Claims, No Drawings

COMMINUTION PROCESS AND PIGMENT

This invention relates to the manufacture of pigments of improved tinctorial properties and dispersibility.

The majority of organic pigments are produced in the pigmentary state directly from the process of manufacture by, for example, a process of precipitation to produce fine particles of from 0.01 to 1.0 microns diameter. However, some organic pigments are produced as a coarse crude product which may be comminuted to produce the pigmentary state. Thus, for example, crude copper phthalocyanine is obtained as a macrocrystalline product with poor pigmentary properties. The pigmentary properties of the alpha form may be developed by the process of acid pasting and precipitation while the pigmentary properties of the beta form may be developed by a grinding process. Suitable grinding processes are described in UK Pat. No. 911,825. It is also known that grinding in the the presence of crystal growth modifiers and surface active agents yields pigments having improved properties. A typical process is described in U.S. Pat. No. 3,593,927.

We have now found a method of obtaining pigments of improved properties by grinding process.

Accordingly we provide a process of comminution comprising first grinding a mixture of a crude pigment and a fugitive auxiliary and secondly deactivating the fugitive auxiliary.

The process of comminution may be conveniently carried out in prior art apparatus, for example equipment used for dispersion by the paint and printing ink industries. Equipment for this process includes: ball mills, attritors, rod mills (such as the "Microflow Mill," Microflow is a Registered Trade Mark of Torrance and Sons of the United Kingdom), high velocity media mills such as sand mills and bead mills, roller mills such as triple roll or single roll bar mills, kinetic dispersion mills such as the Kady Mill (Registered Trade Mark) and Ultra Turrax mills (Registered Trade Mark), cavitation mixers, ultrasonic mixers, and high shear stress mills such as the sigma bladed mixer.

Preferred comminution equipment includes those mills which appear to be more suited to grinding primary crystals of below 0.1 micron diameter; and these often employ fine grinding media. This may be low velocity media such as for example grinding in the presence of salt in a ball mill, or in the presence of salt in a high shear stress mixer such as a sigma bladed mixer. Alternatively, grinding may be carried out with high velocity media in a sand grinder or bead grinder. Bead grinders charged with particulate grinding elements comprising Ballotini beads are described in the examples, and are preferred for the process of the invention because of their relative effectiveness, simplicity and economy.

Particulate grinding elements used in the process of the invention may be of any hard non-friable material which is insoluble in the aqueous medium used. Particularly they may be of sand, porcelain, glass, salt, plastic or metal. Preferably the grinding media is in the form of glass uniform spheres of about 0.2 to 0.5 millimeters in diameter.

Conventional working-up procedures may follow, for example, filtering, washing, drying and standardizing, or for example, flushing.

The process of our invention may be applied to all organic pigments, but preferably the crude pigment is copper phthalocyanine blue pigment made for example by the well known processes starting from phthalic anhydride or phthalonitrile, respectively.

By fugitive auxiliaries of the invention we mean those amphiphathic molecules (those which contain both hydrophobic groupings and polar groups), nonionic polymers and polyelectrolytes, which perform the role of dispersant or colloidal stabilizer in the process of comminution, but are sufficiently labile as to be capable of being deactivated or removed without substantially adversely influencing the properties of the pigment.

Preferred fugitive auxiliaries of the inventon are the phosphate and sulphate esters of long chain alcohols and long chain alcohol alkoxylates, the long chain alkyl ester sulphonates and the long chain alkyl sulphosuccinates, which are employed in the form of their alkali metal, ammonium or water soluble amine salts; and long chain alkyl glycosides.

More preferred fugitive auxiliaries of the invention are the phosphate and sulphate esters of $C_8$ to $C_{20}$ alcohols and $C_8$ to $C_{20}$ alcohol alkoxylates, the $C_8$ to $C_{20}$ alkyl ester sulphonates and the $C_8$ to $C_{20}$ alkyl sulphosuccinates which are employed in the form of their alkali metal, ammonium or water soluble amine salts.

Corresponding polysiloxane moieties and halogenated alkyls may also be used as fugitive auxiliaries in the process of the invention. Examples of fugitive auxiliaries include sodium lauryl sulphate, the sulphate salts of "Dobanol" 911 alcohol ("Dobanol" is a Registered Trade Mark of Shell Chemicals Proprietary Limited, Australia), the sulphate salts of "Synprol" alcohol ("Synprol" is a Registered Trade Mark of ICI Australia Limited), the sulphate salts of "Oxocol" KO alcohol ("Oxocol" is a Registered Trade Mark of Nissan Chemical Company of Japan), the sulphate salts of "Alfol" 1214 alcohol ("Alfol" is a Registered Trade Mark of Continental Oil Company of U.S.A), the sulphate salts of nonanol (a nine carbon branched alkyl alcohol), the sulphate salts of tridecanol (a thirteen carbon branched alkyl alcohol), the sulphate salts of a 13 carbon secondary alcohol manufactured by Union Carbide, "Calsolene" Oil a sulphated vegetable fatty acid ester ("Calsolene" is a Registered Trade Mark of ICI Australia Limited), "Cirrasol" NAS (sodium lauryl phosphate, "Cirrasol" is a Registered Trade Mark of ICI Limited of the United Kingdom) and "Aerosol" OT (sodium dioctyl sulphosuccinate, "Aerosol" is a Registered Trade Mark of American Cyanamid of the United States of America).

Particularly preferred fugitive auxiliaries are the sulphate or phosphate esters of $C_8$ to $C_{20}$ primary alcohols and $C_8$ to $C_{20}$ primary alcohol ethoxylates containing from 1 to 20 ethyleneoxy groups which are employed in the form of their alkali metal, ammonium or water soluble amine salts.

The concentration in which the fugitive auxiliary is used is not narrowly critical, from 5 to 40 parts by weight of fugitive auxiliary per 100 parts by weight of crude pigment are suitable; 5–20 percent by weight is preferred.

Deactivation of the fugitive auxiliary is a process which depends on the nature of the labile ionogenic group on the auxiliary. Primary alcohol sulphates are susceptible to more than 95% hydrolysis at 95° C at a pH of less than 3 in approximately 15 minutes. Hydrolysis of sulphate esters takes greatly extended periods of time of days and weeks at lower temperatures of 60° down to ambient temperature. We believe that this hydrolysis is catalysed at all temperatures by the presence of the salts of heavy metals such as for example iron, cobalt or nickel. Secondary alcohol sulphates, primary alcohol phosphates, ester sulphonates such as for example $C_{12}H_{25}CO.O(CH_2)_3SO_3^-Na^+$, and dialkyl sulphosuccinates require more severe or more prolonged conditions of hydrolysis than do the primary alcohol sulphates.

Organic pigments vary in their ability to withstand such conditions; from the highly chemically resistant quinacridone, perylene vat pigments and tetrachlorisoindolinones which are resistant, to the monazo lithol and rubine pigments which delake under acid conditions.

We have found that the particularly preferred fugitive auxiliaries of the invention, the primary alcohol sulphate salts, are essentially totally hydrolysed to the alcohol by heating for 9 hours at 95°–100° C at pH 1.5. Furthermore, we have observed that the beta-form copper phthalocyanine pigment remains substantially completely stable under these conditions. Fatty alcohol residues remaining as a consequence of hydrolysis may be left in the pigment composition or preferably may be removed by steam distillation or high temperature drying. Processes of deactivation of the invention including hydrolysis and steam distillation are to be contrasted in their convenience and economy with less convenient and more expensive operations for the removal of auxiliaries of the prior art, such as solvent leaching and extraction. Deactivation and removal of auxiliaries results in an increase in tinctorial strength of the pigment owing to a gain in its chemical purity.

While a pigment may be developed by a suitable grinding process it may be preferred in addition to promote some degree of crystal growth in order to effect the achievement of the optimum crystal size, size distribution and shape. Such crystal growth may be effected during the milling procedure or in a separate operation by, for example, stirring or homogenizing the milled pigment under conditions of, for example, elevated temperature in the presence of suitable solvents, as required. Preferably, in the process of our invention crystal growth may be effected during the deactivation of the fugitive auxiliary; for example during the hydrolysis of a primary alkyl sulphate auxiliary.

We believe that a small but significant degree of solvation of the pigment crystals by the aqueous medium is necessary to effect crystal growth. Solvation of the pigment crystals may be encouraged in the aqueous medium by the addition of organic solvents. Organic solvents which may be used in relatively minor amount to encourage crystal growth include hydrocarbons, halogenated hydrocarbons and oxygenated solvents such s ethers, alcohols, ketones and esters. Preferred organic solvents of the invention are the ether alcohols such as for example 2-butoxy ethanol. Concentrations of the organic solvent are not narrowly critical from 4 to 60 parts by weight per 100 parts by weight of the pigment are suitable; 10–15 percent by weight is preferred. Addition of solvents is not always necessary to the process of the invention where, for example, in the instance of beta-form phthalocyanine blue pigment we have found that the solvation and crystal growth in sodium lauryl sulphate aqueous media is sufficient. Such sufficient solvation and crystal growth during suitable conditions of comminution of the invention leads to increased practicality of the comminutive process, and furthermore to a uniformly distributed range of particle sizes.

The process of our invention may be applied to all organic pigments, but the preferred application of the method of this invention is to copper phthalocyanine.

We have found that the copper phthalocyanine may be converted to the beta form by the process of our invention to yield crystals of good size, distribution and shape.

Particle sizes of, for example, beta form copper phthalocyanine blue pigment of this invention have typically a crystal size of 0.15 micron length, 0.05 micron thickness, that is an axial ratio of 3 to 1, and an exceptionally narrow distribution of particle sizes as observed by electron micrograph.

By beta form we refer to the two practically important polymorphic forms of copper phthalocyanine; alpha and beta, and in industrial terminology the beta form is the greener in shade and the one to which alpha reverts under the action of heat and solvents.

The pigments of this invention display relatively good compatability and tinctorial properties in polyamide media for inks, in aqueous media for inks and coating compositons and a polyolefinic plastic compositions. In the instance of beta-form copper phthalocyanine blue pigment we have found that the pigment with naked surface resulting from the deactivation and removal of the fugitive auxiliary by the process of our inventon is of good dispersibility in and compatibility with a wide range of media including alkyd, polyamide, and nitrocellulose resins.

In addition the pigments of our invention, when compared with those pigments not of our invention, display superior brightness or chroma or saturation of colour when dispersed in alkyd or other oleoresinous media of low polarity, as used in inks and coating compositions. Hence, in a further aspect of our invention we provide new pigment compositions prepared by the process of our invention which are especially valuable as printing inks for colour process printing.

The invention will now be illustrated by, but by no means limited to, the following examples.

EXAMPLE 1

To a stirred vessel was charged 1135 kg of water, 30 kg of 46% sodium hydroxide solution and 470 kg of a 30% solution of Empicol LS 30 sodium lauryl sulphate ("Empicol" is a Registered Trade Mark of Albright and Wilson Australia Limited for a range of surface active agents). To this stirred solution was slowly charged over two hours through a screen 880 kg of crude copper phthalocyanine of 92% purity. This crude copper phthalocyanine had been prepared from urea, phthalic anhydride and cupric chloride in trichlorbenzene solvent. Then 127 kg of 2-butoxy ethanol and 318 kg of water were charged. After stirring further for four hours, this mill base mixture was passed through a bead grinder or disc mill. This bead grinder comprised a cylindrical vessel of 20 gallons capacity, holding 180 kg of 0.5 mm diameter glass beads. It was fitted with a cooling jacket, means of continuously feeding and removing mill base, and a central shaft bearing 20 plane disc impellors. Rotation of the shaft was at such a rate that the peripheral speed of the discs was 1900 feet per minute. Mill base was milled at 30° to 50° C and 25 to 30 kg per hour. This operation was completed and then repeated to achieve two passes of the mill base through the mill.

To a stirred tank there was charged 5,800 kg of water and 320 kg of 30% hydrochloric acid. Milled mill base from the above was charged to this hydrochloric acid solution and the mixture heated to 100° C with live steam and held for 4 hours. At the end of this time, observation by spotting on a filter paper showed that the pigment was highly flocculated and consequently the hydrolysis of lauryl sulphate to lauryl alcohol was substantially complete.

This mixture was cooled to less than 70° C and neutralized to pH 5-6 by addition of 46% sodium hydroxide solution. It was then filtered on a plate and frame filter press and washed thoroughly for 12 hours with water. Wet pigment was discharged from the press and dried on trays in a forced air convection oven at 70° C to less than 0.5% moisture content. Dry pigment was ground in a pin mill so that the product entirely passed through a 150 mesh sieve, to yield a pigment of the invention.

EXAMPLE 2

To a beaker 200 g of crude copper phthalocyanine, 32 g of "Empicol" LPZ sodium lauryl sulphate, 20 g of monoethylene glycol butyl ether, 350 g of water and 8 g of 46% sodium hydroxide solution were mixed and homogenized by means of a laboratory model shrouded turbine stirrer.

A stainless steel cylindrical vessel of 1000 ml capacity and of height equal to its diameter was charged with 1400g of 0.3 mm glass beads. The homogenized mill base was charged to the vessel and a stirrer shaft bearing 3 discs was placed in the mixture. A lid with stirrer guide was bolted to the top of the vessel and the voids and free volume of the vessel completely filled with mill base. On a drill press the stirrer was driven at such a rate that the peripheral speed of the discs was 1800 feet per minute. Milling ws continued for 2 hours.

Mill base was then separated from the beads by sieving through a 200 mesh sieve. It was then charged to 2 liter of water and 40 ml of concentrated hydrochloric acid and boiled for 6 hours. Pigment was then filtered on a Buchner funnel, washed well with water, and dried at 70° C in a convection oven. It was dry ground in a pestle and mortar and passed through a 100 mesh sieve, to yield a pigment product of the invention.

EXAMPLE 3

To a beaker was charged 152.7 parts of water, 1.7 parts of acetic acid, 8.4 parts of molten "Duomeen" T ("Duomen" is a Registered Trade Mark of the Armour Industrial Chemical Company of the United States of America for essentially $C_{18}H_{37}NH(CH_2)_3NH_2$) and 17.2 parts of ethylene glycol n-butyl ether. The amine was dissolved, and 120g of crude copper phthalocyanine was stirred in. This was milled with glass beads of 0.5 mm ± 0.05 mm in the apparatus described in Australian Patent Specification No. 241606 until the particle size of the largest particles was less than 1 micron in diameter. This pigment suspension was separated from the glass bead grinding elements by filtration through cotton cloth, made alkaline with 2N caustic soda solution and the flocculated slurry was homogenized for 5 minutes in a high speed kinetic dispersion mill. Pigment was filtered, washed free of alkali and dried in an oven to yield a product, not of this invention but of the prior art according to U.S. Pat. No. 3,593,927.

EXAMPLE 4

To a stirred vessel was charged 250 gallons of water, 100 lb of 90% acetic acid and 144 lb of molten 95% "Duomeen" T. Stirring was continued while 1900 lb of crude copper phthalocyanine was charged over a period of two hours. A pH measurement was made to confirm acidity, and 270 lb of 2-butoxy ethanol was charged to the mixture. This mill base was then passed through an in-line kinetic-disperser homogeniser to another vessel where the mill base was stirred for eight hours to deaerate.

After deaeration the mill base was passed through a bead grinder as described in Example 1, but containing 700 lb of 0.5 mm diameter glass beads, and milled at 30° C and 80 – 84 lb per hour. Milling was completed and repeated twice to achieve three passes of the mill base through the mill.

Mill base, 466 gallons, was charged to a clean tank contaning 466 gallons of water, 40 lb of hindered phenol antioxidant, and 3 lb of the triethanolamine salt of dodecyl benzene sulphonic acid. Into another vessel is charged 1532 gallons of water and 280 lb of 46% sodium hydroxide solution. This is circulated at 5000 gal per hour through an in-line homogenizer. Mill base is then pumped via a centrifugal pump into the inlet of the homogenizer; into the circulating dilute sodium hydroxide solution, over 2 hours. Homogenizing is continued for 12 to 16 hours.

This slurry is then pumped to filter presses, washed with town's water for 12 hours, and dried in a forced air circulation oven at 70° C, to yield a product, not of this invention but of the prior art according to U.S. Pat. No. 3,593,927.

EXAMPLE 5

The procedure of Example 2 was followed, except that the organic solvent 2-butoxy ethanol was entirely omitted and replaced only by water.

EXAMPLE 6

In a glass reaction vessel equipped with heating bath and stirrer, one mole of "Dobanol 911" (Dobanol is a Registered Trade Mark of Shell Chemicals Australia Propietary Limited), a substantially linear, ten carbon average, alkyl primary alcohol, was heated and stirred at 115° C with 1.1 mole of sulphamic acid and 0.1 mole urea as catalyst for five hours when the sulphamic acid was almost entirely dissolved and reacted, to yield with 97% conversion of the alcohol the ammonium "Dobanol 911" sulphate.

This ammonium "Dobanol 911" sulphate was used to replace "Empicol LPZ" sodium lauryl sulphate on an equal solids basis, that is it was used at a level of 16% solids on pigment, in the procedure of Example 2 which was followed to yield a pigmentary product of the invention.

EXAMPLE 7

The procedure of Example 5 was followed except that on completion of hydrolysis the residual lauryl alcohol was removed by steam distillation to give, after filtration, washing, drying, grinding and sieving a pigment of enhanced tinctorial properties.

EXAMPLE 8

Example 1 was repeated except that the mill base was milled at 30° to 60° C and 25 to 40 kg per hour using 0.25

± 0.05 mm diameter lead glass beads, to yield a pigment of the invention.

EXAMPLE 9

Example 2 was repeated using 200 g of crude copper phthalocyanine, 32 g of "Empicol" LPZ sodium lauryl sulphate (90% active), 20 g of monoethylene glycol butyl ether, 400 g of water and 2 g of 46% sodium hydroxide solution as mill base and using 0.25 ± 0.05 mm lead glass beads as the grinding elements, to yield a pigment of the invention.

EXAMPLE 10

In a 2000 liter, glass-lined reaction vessel, equipped with hot oil jacket, anchor stirrer and air condenser, 620 kg of "Dobanol 911" ("Dobanol" is a Registered Trade Mark of Shell Chemicals Australia Proprietary Limited), a substantially linear, ten carbon average, alkyl primary alcohol, was heated and stirred, at 120°–130° C, with 420 kg of finely ground sulphamic acid and 25 kg of urea as catalyst for 8 hours. The mixture was then cooled to less than 100° C, 30 kg of flake sodium hydroxide was added to neutralize the excess sulphamic acid, and the mixture was diluted with 500 kg of water to give 60% slurry of ammonium "Dobanol 911" sulphate.

To a stirred vessel was charged 1900 kg of water, 15 kg of 46% sodium hydroxide solution, 230 kg of 60% ammonium "Dobanol 911" sulphate and 880 kg of crude copper phthalocyanine powder of 92% purity. This mill base was milled as for Example 8. To a stirred tank there was charged 7500 kg of water and 120 kg of 98% sulphuric acid. The milled mill base from the above was charged to this acid solution and the mixture was heated to 90° C with live steam and held at this temperature for 6 hours. After this time, the slurry was cooled to below 70° C with cold water and the pH adjusted to 5–6 by addition of 46% sodium hydroxide solution. It was then filtered on a plate and frame filter press and washed thoroughly for 12 hours with water. Wet pigment was discharged from the press and dried on trays in a forced air convection oven at 130° C until no "Dobanol 911" could be detected at the oven outlet. The dried pigment was ground in a pin mill so that the product entirely passed a 100 mesh sieve, to yield a pigment of the invention.

EXAMPLE 11

In a beaker, 200 g of 95% crude copper phthalocyanine, 30 g of 60% ammonium "Dobanol 911" sulphate, 1 g of 46% sodium hydroxide and 400 g of water were mixed and homogenized by means of a laboratory model shrouded turbine stirrer. This mill base was milled as for Example 9 but at a temperature of 80° C. The milled mill base was then charged to 2 liter of 1% hydrochloric acid and heated at 90°–95° C for 6 hours. The pigment was then filtered, washed with hot water, and dried at 120°–130° C in a convection oven. It was dry-ground in a pestle and mortar and passed through a 200 mesh sieve, to yield a pigment of the invention with enhanced tinctorial strength.

EXAMPLE 12

The procedure of Example 9 was followed except that the "Empicol LPZ" sodium lauryl sulphate was replaced by 24 g of the mono ester phosphate of lauryl alcohol ethoxylated with 8 moles of ethylene oxide, that is, it was used at a level of 12% solids on pigment to yield a pigmentary product of the invention.

EXAMPLE 13

The procedure of Example 11 was followed except that the ammonium "Dobanol 911" sulphate was replaced by 36 g of disodium "Dobanol 911" phosphate and the milling was carried out for 1.5 hours to yield a pigmentary product of the invention.

EXAMPLE 14

Evaluation of tinctorial property of saturation or brightness of the pigments of the invention was carried out by mulling exactly 0.200 g of the pigments with exactly 2.000 g of titanium dioxide in a medium comprising a long oil architectural alkyd dissolved in linseed oil, by means of an Ault and Wiborg automatic muller. Samples were cast as films, side by side for comparison, and quantitatively assessed either visually or by the use of a tristimulus colourimeter.

Evaluation of dispersibility of the pigments in oleoresinous media was carried out by premixing the pigment with alkyd resin using prescribed amounts, and observing the fineness of grind at each of several passes over a laboratory triple roll mill. The number of passes required to reduce the fineness of grind to less than seven microns was noted.

Compatability of the pigments in polar media, by which is meant polyamide or nitrocellulose resins dissolved in oxygenated organic solvents including ethanol, was assessed for the purpose of this invention by the following abstracted procedure which we believe yields results representative of performance in actual polar media. A six ounce jar containing 2 g of pigment, 50 ml of solvent comprising ethanol and toluene in ratio of 7/1, and 100 g of 3 mm diameter glass beads was shaken for half an hour on a shaker. Fineness of grind readings were noted at intervals during this milling. This solvent dispersion was then cast as a film by drawdown with a number 6 or 8 wire wound Meyer bar on clear polyester film and assessed visually.

The results are presented in Table I.

TABLE I

| Example | 1 | 2 | 3 | 4 | 5 | 6 |
|---|---|---|---|---|---|---|
| Saturation or Brightness in oleoresinous media | 1NBS | 1.5NBS | Standard | Standard | 1.5NBS | 1NBS |
| | Examples of the invention are 1 to 1.5 National Bureau of Standards Unit (Judd) more bright or more blue, or more saturated. 0.4 NBS represents the colour difference just discernable to the trained eye. | | | | | |
| Dispersibility in oleoresinous media. Passes. | 3 | 2 | 3 | 3 | 2 | 2 |
| Dispersibility in polar media Appearance in polar media | Faster Strong blue reddish Bright | Faster Strong blue reddish Bright | Standard Weak opaque greenish Dull | Standard Weak opaque greenish Dull | Faster Strong blue reddish Bright | Faster Strong blue reddish Bright |
| Gloss in | | | | | | |

TABLE I-continued

| polar media Example | Glossy 8 | Glossy 9 | Matte 10 | Matte 11 | Glossy 12 | Glossy 13 |
|---|---|---|---|---|---|---|
| Saturation or Brightness in oleoresinous media. | 1NBS | 1.5NBS | 1NBS | 1.5NBS | 1.5NBS | 1.5NBS |
| | Examples of the invention are 1 to 1.5 National Bureau of Standards Unit (Judd) more bright or more blue, or more saturated. 0.4 NBS represents the colour difference just discernable to the trained eye. | | | | | |
| Dispersibility in oleoresinous media. Passes. | 3 | 2 | 3 | 1 | — | — |
| Dispersibility in polar media | Faster | Faster | Faster | Faster | — | — |
| Appearance in polar media | Strong blue reddish Bright | Strong blue reddish Bright | Strong blue reddish Bright | Strong blue reddish Bright | Strong blue reddish Bright | Strong blue reddish Bright |
| Gloss in polar media | Glossy | Glossy | Glossy | Glossy | Glossy | Glossy |

We claim:

1. In a process of comminution comprising grinding a mixture of a crude pigment and a fugitive auxiliary wherein the fugitive auxiliary is a long chain alkyl glycoside, or an alkali metal, ammonium or water soluble amine salt of a phosphate or sulfate ester of a long chain alcohol or a long chain alcohol alkoxylate, a long chain alkyl ester sulfonate, or a long chain alkyl sulfosuccinate, said fugitive auxiliary being suitable as a dispersant or colloidal stabilizer in the process of comminution but sufficiently labile so as to be capable of being deactivated or removed without adversely influencing the properties of the pigment, the improvement which comprises deactivating the fugitive auxiliary by hydrolysis and removing the remaining long chain alcohol or long chain alcohol alkoxylate residues from the pigment composition by steam distillation or high temperature drying.

2. A process according to claim 1 wherein the pigment is copper phthalocyanine.

3. A process according to claim 1 wherein the fugitive auxiliary is a phosphate or sulphate ester of a $C_8$ to $C_{20}$ alcohol or a $C_8$ to $C_{20}$ alcohol alkoxylate, a $C_8$ to $C_{20}$ alkyl ester sulphonate or a $C_8$ to $C_{20}$ alkyl sulphosuccinate, employed in the form of an alkali metal, ammonium or water soluble amine salt.

4. A process according to claim 1 wherein the fugitive auxiliary is a phosphate or sulphate ester of a $C_8$ to $C_{20}$ primary alcohol or a $C_8$ to $C_{20}$ primary alcohol ethoxylate containing from 1 to 20 ethyleneoxy groups, employed in the form of an alkali metal, ammonium or water soluble amine salt.

5. A process according to claim 1 wherein the fugitive auxiliary is deactivated by hydrolysis of the labile ionogenic group.

6. A process according to claim 5 wherein the hydrolysis is effected under acidic conditions at an elevated temperature.

7. A process according to claim 1 wherein 5 to 40 parts by weight of fugitive auxiliary per 100 parts by weight of crude pigment is used.

8. A process according to claim 7 wherein the amount of fugitive auxiliary used is 5 to 20% by weight of the crude pigment.

9. A process according to claim 1 wherein an organic solvent is added to the comminution media.

10. A process according to claim 9 wherein the organic solvent is an alkyl glycol ether.

11. A process according to claim 10 wherein the alkyl glycol ether is 2-butoxyethanol.

12. A process according to claim 9 wherein from 4 to 60 parts by weight of organic solvent is used per 100 parts by weight of crude pigment.

13. A process according to claim 12 wherein the amount of organic solvent used is 10 to 15 percent by weight of the crude pigment.

14. A process according to claim 1 wherein first crude copper phthalocyanine is comminuted using about 16 percent by weight based on the crude pigment of sodium lauryl sulphate as fugitive auxiliary and secondly after completion of comminution the sodium lauryl sulphate is deactivated by hydrolysis to lauryl alcohol under acidic conditions at an elevated temperature.

15. A process according to claim 1 wherein the drying occurs at a temperature between 120°–130° C.

16. A process according to claim 1 wherein the fugitive auxiliary is sodium lauryl sulphate, the sodium salt of the sulphate ester of a substantially linear primary alcohol containing an average of 10 carbon atoms or the ammonium salt of the sulphate ester of a substantially linear primary alcohol containing an average of 10 carbon atoms.

17. A process according to claim 1 wherein first crude copper phthalocyanine is comminuted using about 14% by weight based upon the crude pigment of the sodium salt of the sulphate ester of a substantially linear primary alcohol containing an average of 10 carbon atoms as fugitive auxiliary and secondly after completion of comminution said fugitive auxiliary is deactivated by hydrolysis to the primary alcohol under acidic conditions at an elevated temperature.

18. A pigmentary composition prepared according to claim 1.

19. A pigmentary composition prepared according to claim 2.

20. A pigmentary composition prepared according to claim 14.

21. A pigmentary composition prepared according to claim 17.